United States Patent
Chanda et al.

(10) Patent No.: US 11,320,306 B2
(45) Date of Patent: May 3, 2022

(54) OPTICAL FREQUENCY-SELECTIVE ABSORBER-BASED INFRARED DETECTOR, METHODS, AND APPLICATIONS

(71) Applicant: UNIVERSITY OF CENTRAL FLORIDA RESEARCH FOUNDATION, INC., Orlando, FL (US)

(72) Inventors: Debashis Chanda, Orlando, FL (US); Sushrut Modak, Orlando, FL (US); Jonathan Lee, Orlando, FL (US); Alireza Safaei, Orlando, FL (US)

(73) Assignee: UNIVERSITY OF CENTRAL FLORIDA RESEARCH FOUNDATION, INC., Orlando, FL (US)

( * ) Notice: Subject to any disclaimer, the term of this patent is extended or adjusted under 35 U.S.C. 154(b) by 0 days.

(21) Appl. No.: 15/538,746

(22) PCT Filed: Dec. 17, 2015

(86) PCT No.: PCT/US2015/066398
§ 371 (c)(1),
(2) Date: Jun. 22, 2017

(87) PCT Pub. No.: WO2016/106083
PCT Pub. Date: Jun. 30, 2016

(65) Prior Publication Data
US 2018/0045560 A1    Feb. 15, 2018

Related U.S. Application Data

(60) Provisional application No. 62/095,876, filed on Dec. 23, 2014.

(51) Int. Cl.
*G01J 5/08*    (2022.01)
*G01J 1/42*    (2006.01)
(Continued)

(52) U.S. Cl.
CPC .............. *G01J 1/42* (2013.01); *G01J 1/0228* (2013.01); *G01J 3/027* (2013.01); *G01J 3/46* (2013.01); *G01J 5/0853* (2013.01)

(58) Field of Classification Search
CPC .. G01J 1/42; G01J 1/0228; G01J 3/027; G01J 3/46; G01J 5/0853
See application file for complete search history.

(56) References Cited

U.S. PATENT DOCUMENTS

| | | | | |
|---|---|---|---|---|
| 6,225,629 | B1* | 5/2001 | Ju | G01J 5/20 250/332 |
| 2003/0071215 | A1* | 4/2003 | Ajisawa | G01J 5/20 250/338.1 |

(Continued)

OTHER PUBLICATIONS

Chanda et al. Coupling of plasmonic and optical cavity modes in quasi-three-dimensional plasmonic crystals, Nature Communications vol. 2, 479, 7 pages (Year: 2011).*

(Continued)

*Primary Examiner* — David P Porta
*Assistant Examiner* — Shun Lee
(74) *Attorney, Agent, or Firm* — Allen, Dyer, Doppelt + Gilchrist, PA

(57) ABSTRACT

A subwavelength gold hole/disk array that when coupled with a ground plane induces extraordinary transmission through the hole/disk array and zero back reflection. The hole/disk array functions as a "light funnel" in couling incident radiation into the cavity with about 100% efficiency over a narrow resonant bandwidth, which results in frequency-selective perfect (~100%) absorption of the incident (Continued)

radiation. Such an optical frequency-selective absorber enables flexible scaling of detector response to any wavelength range by pattern dimensional changes, enabling uncooled frequency selective detection and "color" imaging in the infrared domain. Methods and applications are disclosed.

1 Claim, 12 Drawing Sheets

(51) Int. Cl.
*G01J 3/46* (2006.01)
*G01J 1/02* (2006.01)
*G01J 3/02* (2006.01)

(56) References Cited

U.S. PATENT DOCUMENTS

| | | | | |
|---|---|---|---|---|
| 2013/0228887 | A1* | 9/2013 | Wehner | H01L 27/1446 257/432 |
| 2013/0299933 | A1* | 11/2013 | Knight | H01L 31/0384 257/436 |
| 2015/0308962 | A1* | 10/2015 | Mazzillo | G01N 21/85 250/208.2 |
| 2017/0336695 | A1* | 11/2017 | Puscasu | G01J 5/024 |

OTHER PUBLICATIONS

Chanda et al. Coupling of plasmonic and optical cavity modes in quasi-three-dimensional plasmonic crystals, Nature Communications vol. 2, 479, 6 pages of supplementary information (Year: 2011).*

Shinpei Ogawa et al., "Wavelength selective wideband uncooled infrared sensor using a two-dimensional plasmonic absorber", Optical Engineering, Dec. 19, 2013 (Dec. 19, 2013), vol. 52(12), pp. 127104-1-127104-5.

Debashis Chanda et al., "Coupling of plasmonic and optical cavity modes in quasi-three-dimensional plasmonic crystals", Nature Communications, 2:479, vol. 2, Sep. 20, 2011 (Sep. 20, 2011), pp. 1-7.

F. Pelayo Garcia De Arquer et al., "Multiband Tunable Large Area Hot Carrier Plasmonic-Crystal Photodetectors", Jun. 11, 2014 (Jun. 11, 2014), pp. 1-22.

M. E. Stewart et al., "Quantitative multispectral biosensing and 1D imaging using quasi-3D plasmonic crystals", Proceedings of the National Academy of Sciences, vol. 103, No. 46, Nov. 14, 2006 (Nov. 14, 2006), pp. 17143-17148.

Mohamadreza Najiminaini et al., "A Three-Dimensional Plasmonic Nanostructure with Extraordinary Optical Transmission", Plasmonics (2013) 8:217-224, vol. 8, No. 2, Jul. 10, 2012 (Jul. 10, 2012), pp. 217-224.

International Search Report and Written Opinion, Form PCT/ISA/220, International Application No. PCT/US2015/066398, pp. 1-12, International Filing Date Dec. 17, 2015, mailind date of Search Report dated Mar. 29, 2016.

* cited by examiner

OPTICAL FREQUENCY-SELECTIVE ABSORBER-BASED INFRARED DETECTOR, METHODS, AND APPLICATIONS

RELATED APPLICATION DATA

The instant application claims priority to U.S. Provisional application Ser. No. 62/095,876 filed Dec. 23, 2014, the subject matter of which is incorporated herein by reference in its entirety.

BACKGROUND

Aspects and embodiments of the invention are directed to an infrared (IR) detector, a method for making an IR detector, and applications for use of an IR detector. More particular aspects and embodiments of the invention are directed to an optical frequency-selective absorber as an uncooled IR detector, a method for making such an IR detector, and applications for use of such an IR detector.

Mid-infrared (mid-IR) detection and imaging over atmospheric transparent 3-5 µm and 8-12 µm windows are becoming increasingly important for space exploration, spectroscopy, meteorology, chemical/biological identification, short range communication, flame detection, radiation thermometry, target tracking, night vision, remote sensing, leak detection, house damage inspection etc. Narrowband infrared absorption spectroscopy has proven to be a very important tool in the detection and identification of airborne chemicals where pattern recognition is used as a post processing step to compare the infrared spectrum of library molecules against the infrared spectra of airborne contaminants. However, available cooled (MCT) and uncooled (microbolometers) IR detectors are broadband in nature (referred to as "bucket detectors"); individual pixels absorb radiation across the entire infrared region thus generating an integrated IR signal. Such broadband detector arrays are not sensitive enough to perform low concentration chemical detection from IR radiation. In particular, detection sensitivity of microbolometer arrays operating in the mid-IR region is limited by the black-body radiation limit. All IR-detectors detect self-radiation emitted from various surfaces of the sensor-layered architecture, which typically is minimized with the use of cold-shields. However, such cold-shields defeat the purpose of uncooled detection.

There are two major limitations in infrared detection and imaging. First, due to the low photon energy of infrared radiation, cryogenic cooling is required for high sensitivity detection based on narrow bandgap materials such as, e.g., mercury-cadmium-telluride (HgCdTe). Various kinds of microbolometers primarily based on vanadium oxide ($VO_x$) offer uncooled detection of IR radiation. However, microbolometers suffer from low sensitivity, slow response, and tedious multi-step, complex lithographic processes. The second is the absence of 'color' imaging capabilities in the infrared domain. At present, most if not all cooled and uncooled mid-IR detectors are "bucket" detectors that generate integrated spectral images in binary color format (offering only the choice of any two 'pseudo' colors).

For spectroscopic sensing applications, it would be advantageous and beneficial to enable a frequency selective, narrowband detector with a narrow field-of-view to minimize the effects of self-radiance. Given a broad spectrum of radiation being emitted by a source, such a frequency selective response could be used to interpret infrared pseudo "colors." The visible light spectrum contains all of the traditional colors (blue, yellow, green, etc.), but in the infrared there are no traditional colors. However, by detecting different wavelength bands independently, one could form pseudo "color" images in the infrared domain.

It would thus be advantageous to provide a narrow-band, uncooled IR detector that exhibits flexible scaling of detector response to any wavelength range that enables "color" imaging in the infrared domain. Further advantageous would be realized by simple nanoimprint lithography based detector fabrication resulting in reduced fabrications costs as well as high resolution detection. The embodied optical frequency-selective absorber based infrared detectors and fabrication techniques enable the aforementioned advantages and resulting benefits.

SUMMARY

The embodied uncooled optical frequency-selective absorber-based detectors offer wavelength selectable (over the entire mid-IR band) detection and can be manufactured using relatively simple nanoimprint-based fabrication methods.

An aspect of the invention is an optical frequency-selective absorber-based frequency-tunable, infrared (IR) detector (referred to hereinafter as the "IR detector"). According to a non-limiting embodiment, the IR detector is comprised of a two-element array including a perforated metallic, sub-wavelength-sized hole array element optically coupled with an underneath-disposed sub-wavelength-sized disk array element, characterized to function as a "light funnel" to trap incident radiation as dipole currents, and a ground plane attached to the patterned surface. The IR detector may further include without limitation, alone or in various combinations, the following limitations, features, or characterizations:
wherein the hole/disk array is made of a gold film having a thickness between 25 -100 nm;
wherein the detector is uncooled in an operational state;
wherein the IR detector is characterized by a response that is tunable as a function of hole-disk and disk-disk coupling as a function of at least one of dimensions, array spacing, and cavity thickness;
wherein the IR detector further includes a reflective surface disposed underneath the hole/disk array element so as to form an optical cavity comprising the hole/disk array and the reflective surface;
wherein the IR detector is characterized by a localized surface plasmon resonance (LSPR) that is tunable as a function of a change in at least one of a diameter and/or period;
wherein the IR detector is characterized by a ~100% extraordinary absorption over a full operational detectable bandwidth of the detector.

An aspect of the invention is a method for detecting a selected narrow bandwidth IR signal. According to a non-limiting embodiment, the method involves the steps of providing a metallized, optical frequency-selective absorber-based IR detector that exhibits an electron plasma loss-induced ~100% absorption of incident IR radiation, and directly probing an induced micro-current plasma loss at discrete regions of the patterned metallized surface, using a weak bias current. The IR detection method may further include without limitation, alone or in various combinations, the following steps, limitations, features, or characterizations:
providing a two-element perforated metallic, sub-wavelength-sized hole array element optically coupled with an underneath-disposed sub-wavelength-sized disk array element, characterized to function as a "light funnel" to trap incident radiation as dipole currents, and a ground plane attached to the array;

providing a gold perforated metallic, sub-wavelength-sized hole/disk array element;

directly probing the induced micro-current plasma loss on each sub-wavelength hole/disc using the weak bias current.

These and other non-limiting and exemplary aspects and embodiments of the invention are described in detail below and in the appended claims.

BRIEF DESCRIPTION OF THE FIGURES

FIG. 3A (middle) illustrates the FDTD predicted change in absorption as a function of wavelength and cavity length of the system with period P=1.4 µm, diameter D=0.76 µm, and relief depth RD=280 nm. The extra phase due to the presence of the coupled disk array inside the cavity is calculated from the CDA method (left) and the corresponding localized surface plasmon resonance LSPR (T of the bare hole/disk) calculated from simulation and CDA method is shown in (right). The figures indicate that the absorption is enhanced when the cavity mode overlaps with the LSPR. The coupled system response deviates from the unperturbed cavity response due to the extra phase, which originates from the coupled disk array inside the cavity. FIG. 3B is a plot showing the wavelength shift ($\Delta\lambda$) between the coupled system and the simple Fabry-Perot cavity estimated from simulation and analytical CDA method; FIG. 3C shows plots of the retrieved permittivity ($\varepsilon$) and permeability ($\mu$) of the system at cavity length 870 nm. Both real components of $\varepsilon$ and $\mu$ cross zero indicating net zero electric and magnetic response at resonance; however, both imaginary components possess resonance indicating loss; FIG. 3D schematically illustrates the corresponding simulated current distribution; FIG. 3E schematically illustrates the corresponding loss profile, according to exemplary aspects of the invention.

FIGS. 5A-3E illustrate the fabricated IR detector. FIG. 5A shows SEM images of five representative antenna arrays with different hole/disk diameters.

FIGS. 6A-3F illustrate the measured detector response. FIG. 6A shows a plot of the infrared absorption vs. incident power as a function of bias voltage.

Figure 1A:
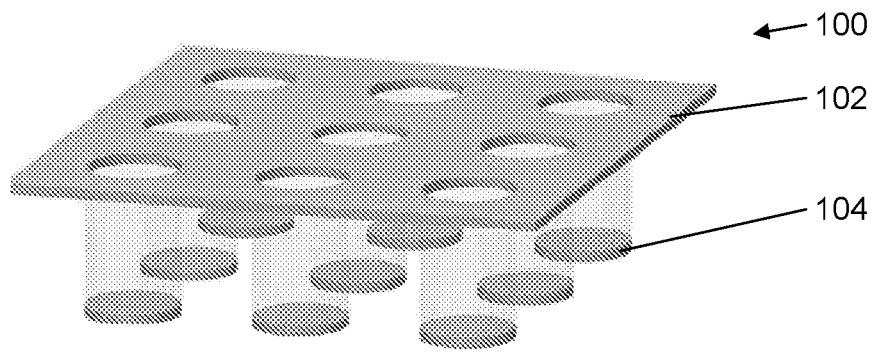
FIG. 1A schematically shows a two-element (hole 102 and disk 104) optical frequency-selective absorber 100.

DETAILED DESCRIPTION OF NON-LIMITING EXEMPLARY ASPECTS AND EMBODIMENTS OF THE INVENTION

Due to low photon energy, frequency selective detection of infrared radiation poses a scientific challenge using natural materials. Cooled and uncooled infrared detectors are broadband in nature, where individual pixels absorb radiation across the entire infrared region, sacrificing spectrally resolved information. A hypothetical optical frequency-selective absorber is an ideal solution to address both cooling and frequency selective detection limitations of present infrared detectors where direct excitation of current on the antenna element avoids cooling requirements and simple dimensional scaling facilitates frequency tunability. However, unlike in the radio frequency (RF) domain, the metal plasma loss prohibits direct detection of infrared radiation by an antenna-like metallic surface.

We disclose a two-element optical frequency-selective absorber which when coupled with a ground plane induces extraordinary transmission through a subwavelength gold hole/disk array and zero back reflection. The hole/disk array functions as a "light funnel" in coupling incident radiation into the cavity over the resonant bandwidth, which results in frequency selective perfect (~100%) absorption of the incident radiation. Such a design enables flexible scaling of detector response to any wavelength range by dimensional changes, enabling uncooled frequency selective detection and "color" imaging in the infrared domain. A short surface plasmon life time on the thin-film with very low thermal mass promises significantly faster detector response compared to bulk absorption based microbolometers. In an un-optimized geometry a frequency selective D* of ~2×10$^5$ √Hz cm/W and rise time of ~2.65 ms at room temperature and pressure were experimentally measured for a narrowband (FWHM ~300 nm) absorption around 4.4 µm. A simple nanoimprint lithography-based large area optical frequency-selective absorber fabrication technique facilitates formation of low cost point detectors as well as high resolution dense focal plane arrays.

The embodied invention answers the scientific question of 'whether it is possible to detect infrared radiation in the same way radio frequency (RF) is detected by RF antennas over a narrow band across the carrier frequency?' The RF antenna is the backbone for all present day radio frequency communications, where a simple piece of metal when exposed to electromagnetic radiation generates current on the metal and vice-versa. However, at optical frequencies the metal's free electron gas sustains surface charge density oscillations, which makes metal extremely lossy at optical frequencies. Hence, all previous efforts based on optical dipole antenna in conjunction with a rectifying diode (in combination called "optical rectenna") produced very low IR-to-electrical conversion efficiencies (<1%) primarily due to very high metal plasma loss at optical frequencies and low antenna IR absorption cross-section. Previous reported attempts using a nanostructured metal IR bolometer resulted in very low peak responsivity of 3 V/W where the detection limit (D*) and temporal response were not reported in the study possibly due to low absorption and higher noise floor. The excitation of surface plasmons at optical frequencies on metal surfaces is unavoidable due to the inherent lattice structures of metals. The question then is whether one can use this loss for the detection of IR radiation?

According to the embodied invention, we first artificially increase the plasma loss so that ~100% incident IR radiation is absorbed. We then devise a mechanism that can sense the loss in order to detect the IR radiation without adding extra noise; a two-element optical frequency-selective surface comprised of a perforated metallic (gold) hole array coupled with an underneath disk array that functions as a "light funnel" to trap incident radiation as dipole currents. The sub-wavelength hole/disk array, when attached with a ground plane, results in extraordinary transmission through the hole array and zero back reflection. The energy is dissipated as electron plasma loss on the hole-disk system inducing perfect ~100% absorption of the incident radiation. This extraordinary absorption originates from simultaneous zero crossing of real components of permittivity and permeability due to the geometrical arrangement of the two metallic elements, which nullifies overall charge and current distributions, prohibiting existence of any propagating electromagnetic states at resonance. Further, the absorption band is shown to tune over the entire mid-IR band by tuning dipolar coupling between the hole/disk elements by flexible changing of element dimensions or array spacing. A coupled-dipole approximation (CDA)-based analytical model is developed to explain the coupling and loss mechanism, which accurately corroborate electromagnetic simulations and experimental observations. Compared to other absorption mechanisms, electron plasma loss offers the advantage of direct detection via an electronic biasing circuit. The continuous perforated film allows direct probing of the induced "micro-current" plasma loss on each nano hole/disk via a weak bias current. Other optical antenna/plasmonic array designs based on sub-wavelength discrete nanostructures demonstrate tight field confinement, but lack overall high absorption as well as direct detection option due to the discrete nature of the designs. The embodied invention combines discreteness and continuity requirements via radiative coupling between two elements taking advantage of both tight field localization of the discrete disk array and direct detection ability of the continuous perforated film.

Furthermore, short surface plasmon life-time on the thin-film (~45 nm) with very low thermal mass provides faster detector response compare to bulk absorption based microbolometers. Our preliminary work in an un-optimized geometry provided a frequency selective D* of ~2×10$^5$ IHz cm/W and rise time of ~1.93 ms at room temperature and pressure for a narrowband (FWHM ~300 nm) absorption around 4.4 µm. Such frequency selective D* is not directly comparable to broadband spectrally integrated D* of present cooled or uncooled IR detectors. The D* is a relative number that is defined with respect to the electrical noise in the system. Commercial scale electrical shielding and packaging of the biasing circuit will significantly improve the D* value. Further design optimization with reduction in thermal conductivity based on a suspended detector architecture and partial vacuum seal following well-known industrial IR detector fabrication procedures will drastically improve the D* value. Such optical frequency-selective absorber design enables flexible scaling of detector response to any wavelength range by dimensional changes, enabling uncooled frequency selective detection and "color" imaging in the infrared domain when arranged in an array format.

Figure 1B:
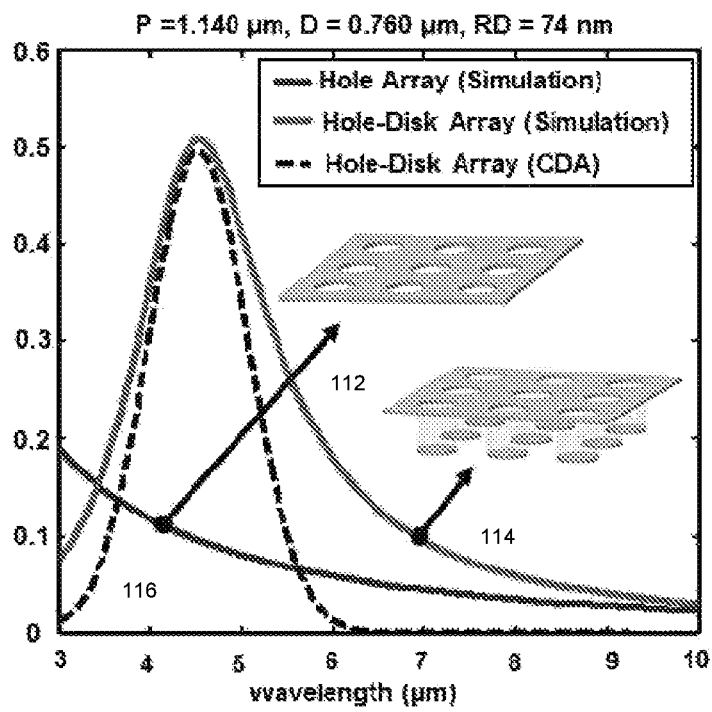
FIG. 1B graphically shows the predicted transmission through the hole 112 and hole/disk array 114 of period P=1.4 µm, diameter D=0.76 µm, and relief depth RD=74 nm. The analytical coupled dipole approximation (CDA) transmission prediction of hole/disk antenna array 116 is overlaid for comparison.
Figure 1C:
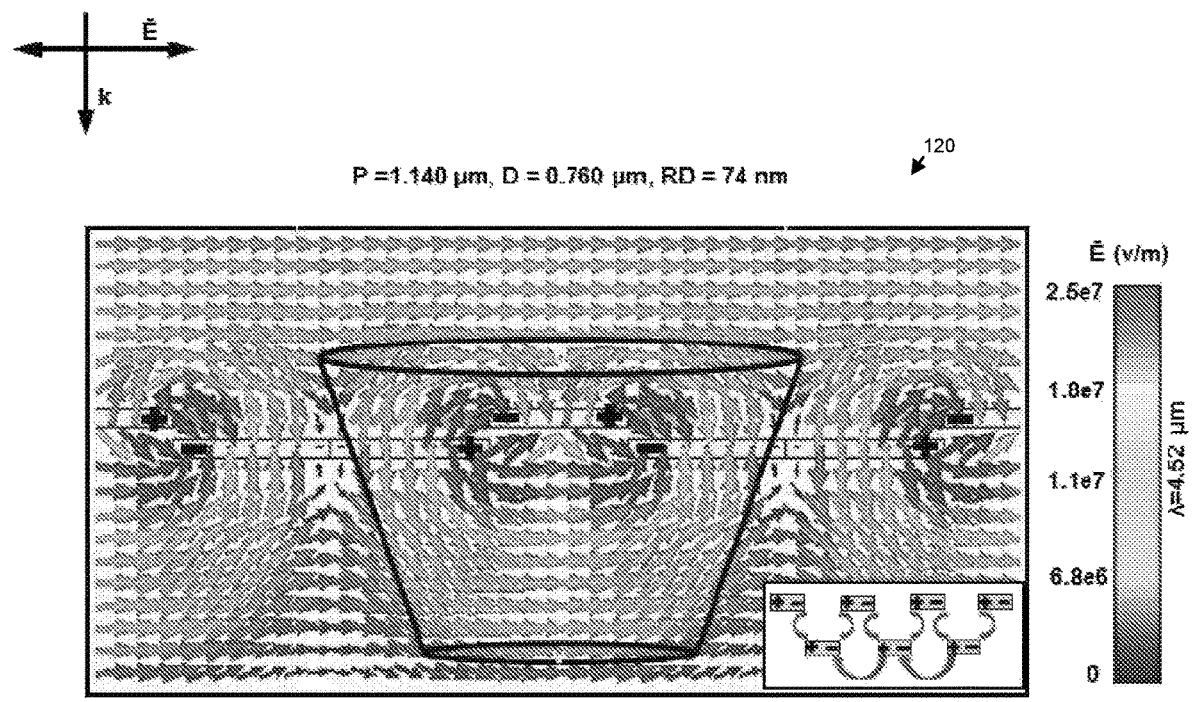
FIG. 1C illustrates the FDTD predicted cross-sectional electric field intensity distribution at the transmission resonance ($\lambda$=4.52 µm) showing strong vertical hole/disk and lateral disk/disk dipolar coupling 120, according to exemplary aspects of the invention.

FIG. 1A illustrates the proposed two-element optical frequency-selective absorber composed of a perforated gold film coupled with a disk array. The transmission predicted from the electromagnetic simulation (CST Microwave Studio) is very low over the 3-10 µm mid-IR band through the chosen hole array with diameter 0.76 µm, period 1.14 µm, and hole/disk separation (relief depth (RD)) of 74 nm as shown in FIG. 1B. An expected decaying non-resonant transmission through the 45 nm thick film based on the gold dispersion is evident for this subwavelength hole array. However, after the addition of a disk array below the hole-array, a strong ~50% transmission peak appears at λ=4.53 µm, as can be seen in FIG. 1B. The high transmission through this hole/disk coupled system originates from a different transmission mechanism than the extraordinary transmission through a simple sub-wavelength metallic hole array. Strong vertical hole/disk and lateral disk/disk dipolar coupling dictates the present sub-wavelength transmission as opposed to surface plasmon polariton (SPP) or localized surface plasmon (LSP) guided transmission through planer sub-wavelength hole array. The cross-sectional electric field distribution in FIG. 1C shows strong vertical hole/disk and lateral disk/disk coupling at the transmission peak. By placing the perforated film on top of the disk-array the weak transmitted electric field in the 3-6 µm wavelength range for the present example (FIG. 1B) excites dipolar localized surface plasmon resonance (LSPR) on the disks. The localized charges on the edges of the disks attract opposite charges on the corresponding edges of the top hole and lateral disk array as can be observed from the electromagnetic simulation in FIG. 1C. Due to strong coupling between each disk/disk and hole/disk pair, the coupled system functions as an optical antenna array and transmits much higher electromagnetic energy than a perforated metallic film alone. The complete process can be understood from a 3D coupled dipole model where each metallic element is assumed as dipole arranged in a quasi-3D periodic array. The electric field from an oscillating electric dipole is given by $$\vec{E} = \frac{1}{4\pi\varepsilon}\left\{\frac{\omega^2}{c^2 r}(\hat{r}\times\vec{p})\times\hat{r} + \left(\frac{1}{r^2} - \frac{i\omega}{cr^2}\right)[3\hat{r}(\hat{r},\vec{p}) - \vec{p}]\right\}e^{i\omega r/c}, \quad \text{Eq. (1)}$$

where $\vec{P}$ is the electric dipole, ω is its angular frequency, and r is the distance between the dipole and observation point. According to this relation, the electric field radiation of the disk array is higher than the perforated film, because the electric dipole moment of the disk is stronger than hole at resonance due to the higher charge concentration and longer lifetime of localized surface plasmons on the isolated disks (less decay channels). Due to dipolar charge oscillations, the disk array reradiates a part of this energy in all directions. In the upper side, most of the energy is reflected back from the hole array, as its transmission is low so the radiation mostly happens in the downward direction. To understand the coupling mechanism, a modified CDA approach in conjunction with calculation of reflection/transmission through a multi-layer stack is followed. In this approach, the coupling between hole/disk and disk/disk dipoles is mediated by near field and far field radiation as calculated using Eq. (1). To further understand the relation between this coupling mechanism and the extraordinary transmission of the hole/disk array, one needs to study the behavior of disk and hole arrays independently. Hole/disk combination forms a complementary system and the transmission through the hole is equal to the reflection from the disk array. The polarizabilty (α) and the lattice contribution (S) of the circular disk array is used to estimate reflection (r)/transmission (t) coefficients of the disk array. Subsequently, the reflection/transmission of the disk array is used to estimate the reflection/transmission of the hole array based on the approximate relation, $t_{hole}/r_{hole} = r_{dhsk}/t_{disk}$. The reflection/transmission coefficients of these independent hole and disk arrays are used to develop the transmission coefficient of the combined hole/disk system based on Fresnel expression of the resultant multi-layer stack. The CDA predicted transmission of the coupled hole/disk system is plotted along with results from electromagnetic simulation in FIG. 1B. The CDA prediction matches numerical simulation closely, vindicating the validity of the analytical model. The overall response of the system can be tuned by manipulating the coupling between hole/disk and disk/disk by changing dimension or array spacing.

Figure 7A:
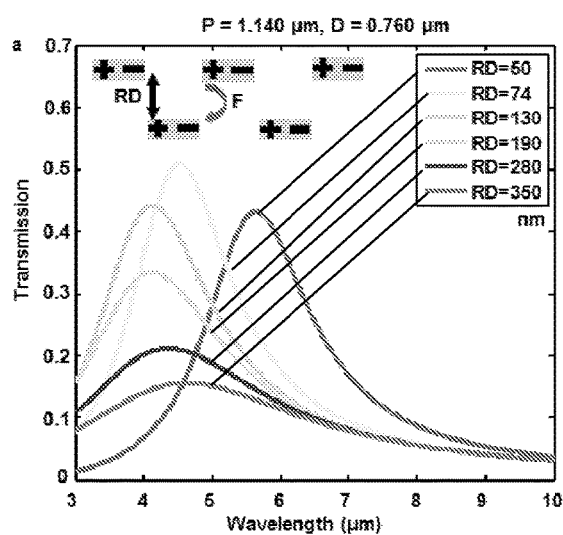
FIG. 7A graphically shows transmission of the hole/disk array for different relief depth (RD) values. By changing the relief depth (RD), two different regimes in hole/disk coupling are observed, which manifest as blue and then red shift of the transmission peak as a function of increase in RD.

By changing the relief depth (RD), two different regimes in hole/disk coupling is observed, which manifests as blue and then red shift of the transmission peak as a function of increase in RD as shown in electromagnetic simulation in FIG. 7A for a constant period, P=1.140 μm, and diameter, D=0.760 μm (which ensures constant disk/disk coupling). Thus there is a phase transition and critical point ($RD_c$) in hole/disk coupling. By decreasing RD, the electrostatic and radiative coupling between hole and disk is increased (Eq. 1), which induces a higher electric field on each other that is opposite to the restoring field of the surface charges on the disk resulting in charge resonance. Due to the decrease in the effective electric field the restoring force spring constant $k_{eff}$ decreases, which in turn red-shifts the transmission peak as $\omega_{res} \propto k_{eff}^{1/2}$. Moreover, the decrease in RD from the critical value increases the opposite electric field on the holes resulting in reduction in the effective electric dipole on the disk. Hence, according to Eq. 1, the total transmission of the disk and hole arrays decreases. In the opposite manner, by increasing RD from $RD_c$, the coupling between hole/disk becomes weaker as a result of the transmission through the hole, and total transmission of the structure diminishes. Due to the reduction in transmission the localized charges on the disk reduces, diminishing the restoring force, which leads to lower spring constant and a red shift for the transmission peak. For a constant hole/disk coupling (constant RD), the extraordinary transmission peak location can be tuned over a wide range by manipulating disk/disk coupling by changing the diameter and period of the system. In our study a relatively large RD=280 nm was used for the ease of actual fabrication of this structure at a later stage because a small RD increases the possibility of destroying the isolation between the hole and disk system during metal deposition.

Figure 7B:
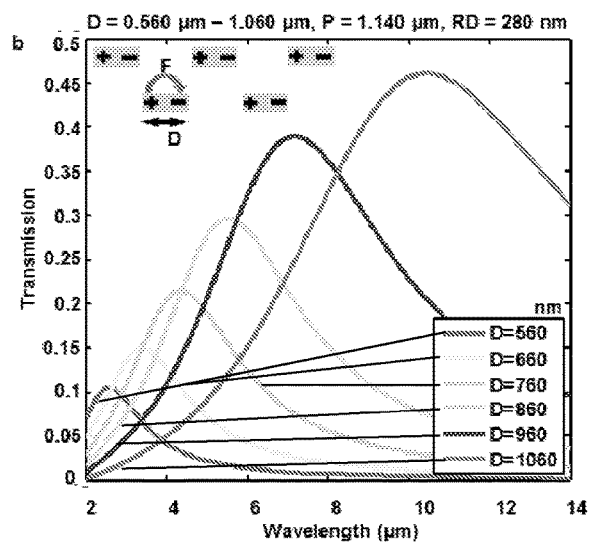
FIG. 7B graphically shows transmission of the hole/disk array for different diameters and constant period. By increasing the diameter, there is a redshift in the transmission peak.
Figure 7C:
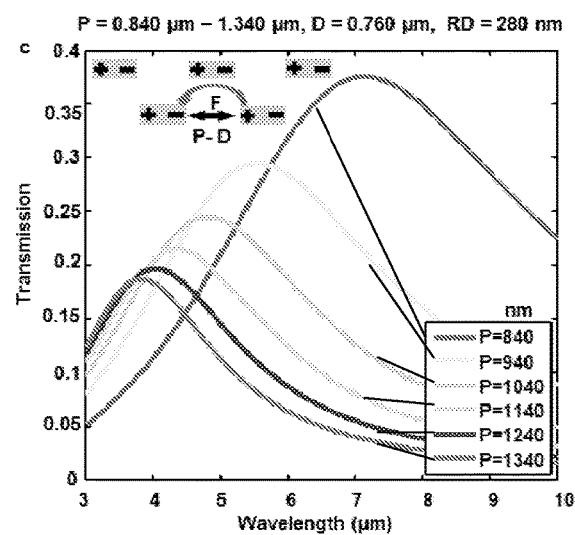
FIG. 7C graphically shows transmission of the hole/disk array for different periods and constant diameter. By increasing the period, there is blue shift in the transmission peak.

In Eq. (1), $|\vec{p}|=qd$ is electric dipole moment, q is the charge, which depends on the electric field strength and the diameter of disk and d is the distance between the charges (which is approximately equal to the diameter). As the LSPR wavelength on the disk is inversely proportional to the diameter, an expected red shift is observed with increase in hole/disk diameter for a constant period as seen in FIG. 7B. Also, for the same case, it can be seen that as the hole diameter is increased the electric dipole ($\vec{P}$) gets stronger and as a result, the transmission is increased as well. On the other hand, as the period increases the distance between elements also increases, and hence, the opposite electric fields on the elements that originate from neighboring localized charges decrease. The effective electric field on the surface and consequently the effective spring constant is increased, which results in blue shift in the spectrum, as shown in FIG. 7C.

Figure 2A:
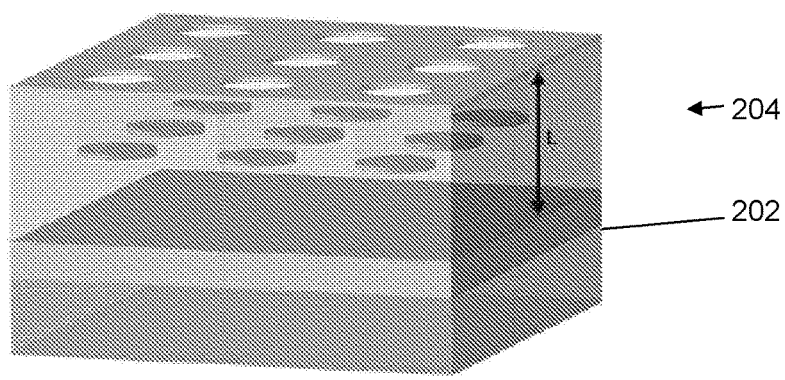
FIG. 2A schematically shows the optical frequency-selective absorber.
Figure 2B:
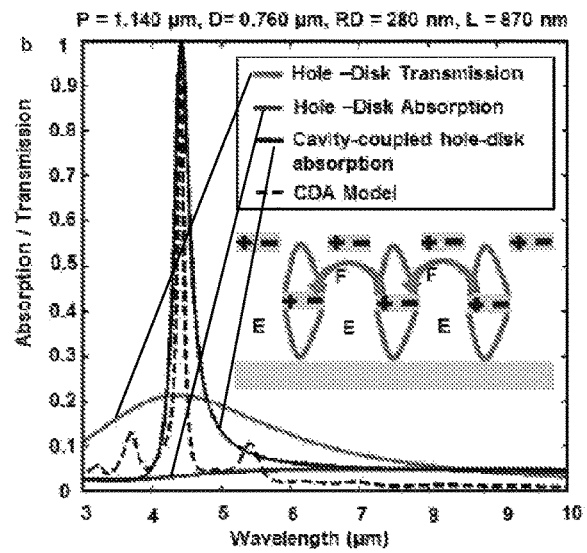
FIG. 2B graphically shows absorption and transmission comparison of coupled and un-coupled systems of period P=1.4 µm, diameter D=0.76 µm, and relief depth RD=280 nm.
Figure 2C:
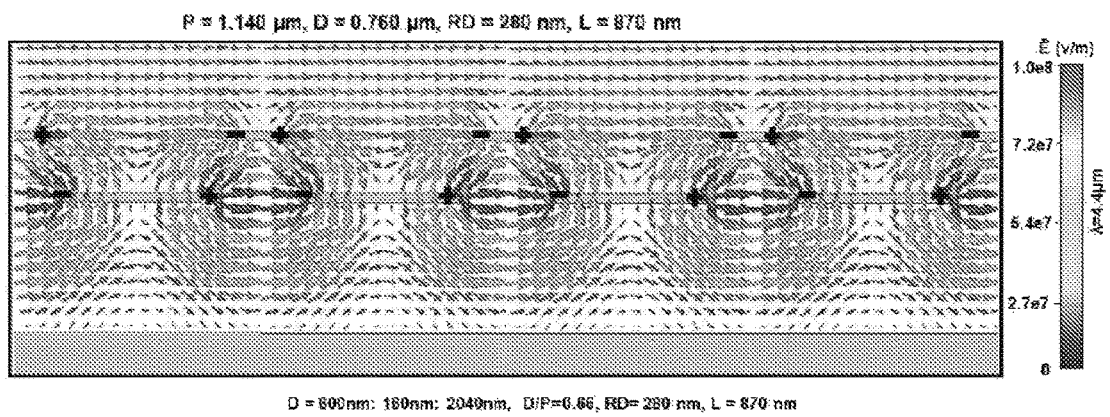
FIG. 2C illustrates the FDTD predicted cross-sectional electric field intensity distribution at the transmission resonance ($\lambda$=4.4 µm) showing enhanced dipolar coupling.
Figure 2D:
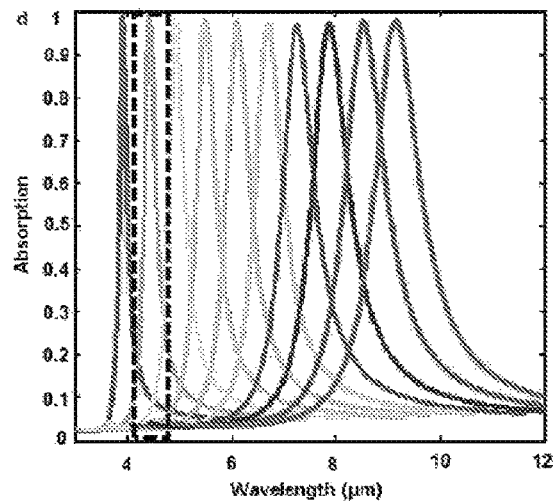
FIG. 2D graphically shows the frequency-selective absorber response as a function of hole/disk diameter and corresponding resonance peak location.
Figure 2E:
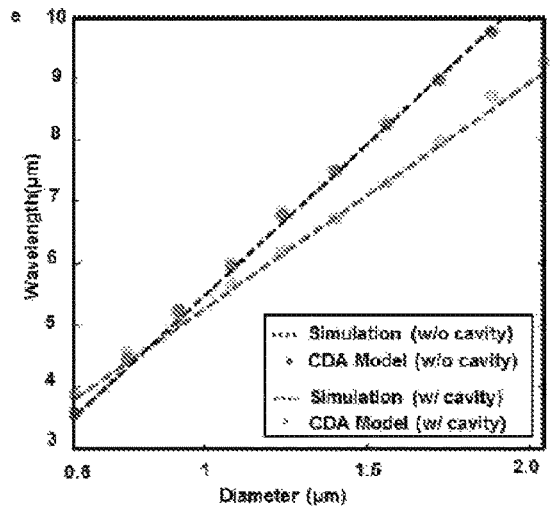
FIG. 2E shows a plot of the change in antenna absorption response as a function of diameter and the corresponding un-coupled system transmission resonance location plotted alongside to demonstrate phase retardation effect, according to exemplary aspects of the invention.
Figure 8:
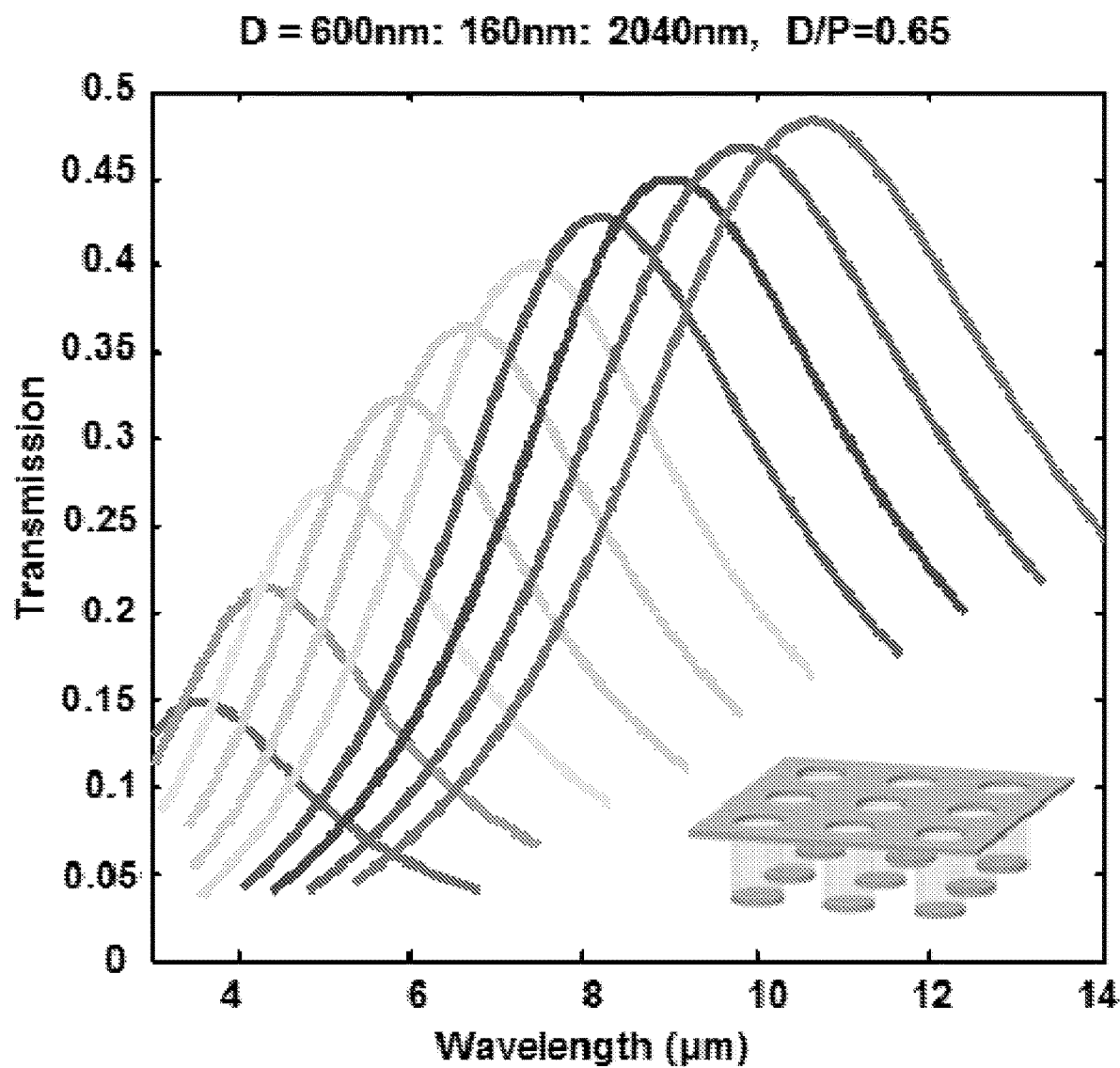
FIG. 8 graphically shows transmission of the hole/disk array for different diameters for a constant D/p=0.65.

The interaction between the two-element hole/disk system and an incident electromagnetic wave is further enhanced by addition of a back mirror 202, which forms an optical cavity 204 as illustrated in FIG. 2A. For a constructive interference inside the cavity the enhanced electric field excites stronger electric dipoles on the hole/disk, which results in zero reflection and enhanced extraordinary transmission through the hole/disk system resulting in ~100% absorption as electron plasma loss as shown in FIG. 2B. The narrow bandwidth of this extraordinary absorption originates from the narrow cavity phase relation based on the Q of the cavity. The transmission through the bare hole/disk system is plotted along with the absorption in the cavity-coupled case in FIG. 2B to demonstrate this spectral narrowing effect. Further, to understand the fundamental physics behind the cavity coupling mechanism with the hole/disk array, the previously introduced CDA method is used to model these interactions accurately. The analytical CDA prediction is overlaid on top of the simulated absorption result in FIG. 2B. The close correspondence between simulation and CDA predictions validates the analytical model. The corresponding electric field distribution predicted from simulation at the resonance is shown in FIG. 2C. It can be observed that the lateral coupling between disk/disk is enhanced by more than one order of magnitude in presence of the cavity (compare FIG. 1C). In a same manner as described for the bare hole/disk system, the extraordinary absorption peak location can also be tuned by changing period and diameter of the system. FIG. 2D shows the absorption spectra as a function of increase in hole/disk diameter from 0.6 μm to 2.040 μm with 0.160 μm increment for a constant D/P=0.66 (the corresponding bare hole/disk system transmission is shown in FIG. 8). The LSPR in hole/disk system red and blue shifts by increasing diameter and period, respectively. With the increase in the period, electric field coupling between neighboring disks/holes decreases. Hence, the effective spring constant $k_{eff}$ and the resonance wavelength decrease with the increase in period in an implicit manner. A closed form expression that relates period with effective spring constant does not exist for 2D arrays due to complexities in multi-modal and multi-dimensional interactions. However, the LSP resonance frequency depends on the diameter explicitly as, $\omega \propto 1/D$. Hence, the resonance frequency is more sensitive to diameter changes. By increasing both diameter and period the effective resonance red shifts. Notably, the extraordinary absorption remains close to 100% over the entire wavelength range (FIG. 2D). The transmission and absorption peaks of the structures without and with the cavity as a function of diameter between 600 nm and 2.040 μm for the constant D/P=0.66 and constant cavity thickness L=870 nm is computed using both CDA and CST simulation, and are plotted in FIG. 2E. A very close correspondence between simulation and the CDA model can be observed in predicting both peak locations. From FIG. 2E it can be observed that the wavelength shift for the cavity-coupled case lags behind the bare hole/disk system due to extra phase accumulation inside the cavity as further discussed below.

Figure 3A:
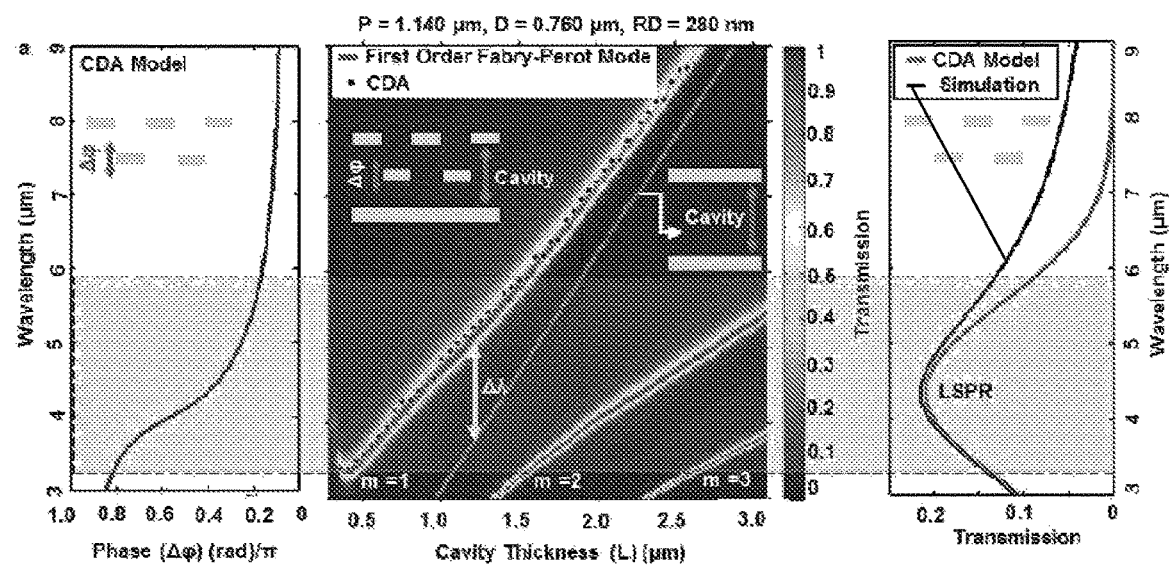
FIGS. 3A-3E illustrate the influence of phase and absorption mechanisms.
Figure 3B:
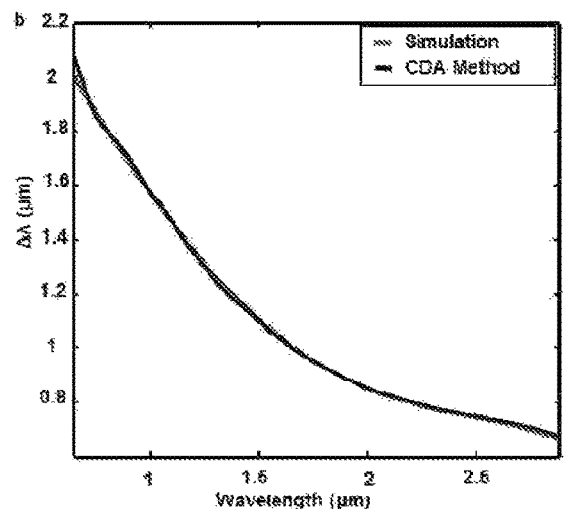

The cavity-induced extraordinary absorption depends on cavity phase relation. Based on the coupled-dipole approximation, we establish the condition for the maximum absorption, which mandates that the excitation of localized surface plasmon resonance should overlap with the Fabry-Perot mode inside the cavity. The Fabry-Perot mode inside the cavity maximizes the electric field on the disk array when it is placed at the position of quarter-wave where the incident and reflecting field are in-phase on the disk surface. As a result, the constructive interference between two counter-propagating waves excites a stronger electric dipole on the elements for the chosen set of hole/disk geometric parameters, which enhances absorption in the wavelength region, which overlaps with the LSPR bandwidth. The simulated 2D absorption spectrum as a function of cavity length and wavelength is shown in FIG. 3A for the hole/disk system having P=1.140 μm, D=0.760 μm, RD=280 nm. The predicted first order Fabry-Perot mode ($L=\lambda/2n_{eff}$) corresponding to a simple planer cavity has been plotted on top of the CST simulation data in FIG. 3A. A clear deviation in resonance of the hole/disk cavity system from the simple FP resonance is evident due to the extra phase shift acquired by the cavity mode in the presence of the disk at the localized surface plasmon resonance. This extra phase shift ($\Delta\varphi$) makes the effective thickness of the cavity larger, which shifts the resonance to a longer wavelength. To quantify this effect, the phase lag from the disk array is calculated from the CDA approach where the phase shift due to the disk array is used to perturb the ideal cavity phase relation, which results in shift in the cavity resonance as can be seen in FIG. 3A (left). As expected, there is a $\pi/2$ phase lag between the dipole oscillator and incident wave (FIG. 3A (left)) at the LSPR wavelength (FIG. 3A (right)). Away from the plasmon resonance, the extra phase shift approaches the steady state phase due to the change in index in the presence of the metallic disk array inside the cavity. The predicted resonance peak shift ($\Delta\lambda$) of the cavity-coupled hole/disk array with respect to the planer Fabry-Perot resonance for the first order mode (m=1) calculated by CDA and electromagnetic simulation is plotted in FIG. 3B. The close match between CDA and simulation vindicates the validity of the analytical phase approximation of the CDA approach. According to FIG. 3A, for low cavity thicknesses the Fabry-Perot resonance peak falls within the LSPR bandwidth of the hole/disk arrays. In addition, for these thicknesses, for the chosen relief depth (RD=280 nm), the disk array approximately satisfies the quarter-wave condition due to the additional phase shift. As a result, the system fulfills all conditions to maximize the electric field on the disk array and consequently the absorption is maximized in this region. At higher cavity thicknesses, these three conditions do not satisfy simultaneously and hence the absorption goes down. However, higher order modes (m=2 and m=3) of the cavity satisfies all of these three conditions over the chosen cavity thickness range resulting in high absorption over the entire range.

Figure 3C:
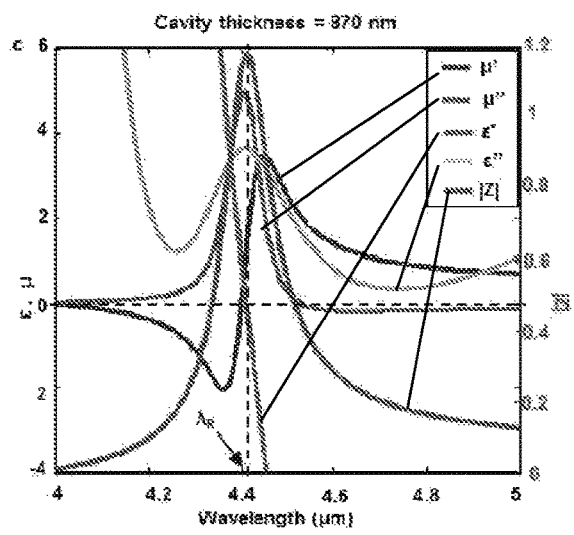
Figure 3D:
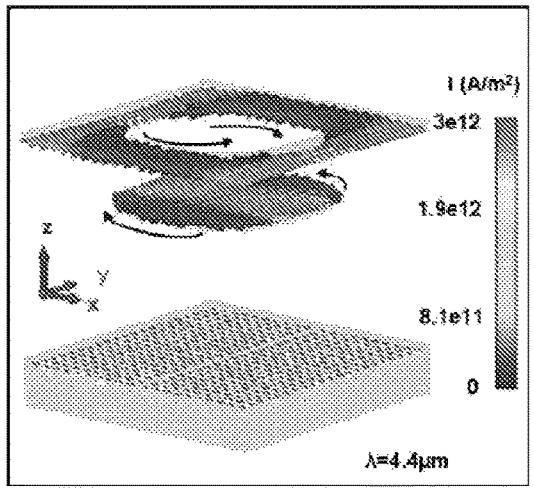
Figure 3E:
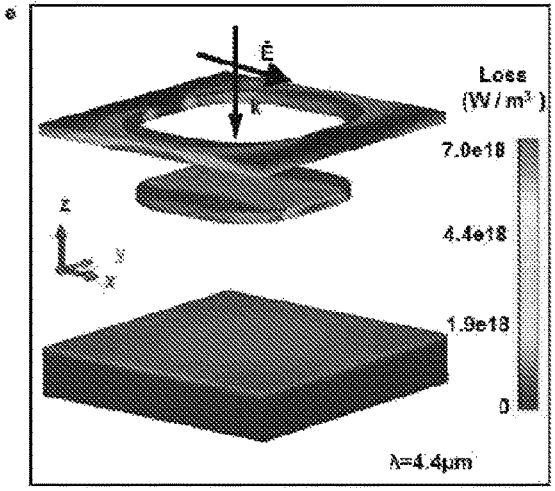

To further investigate the extraordinary absorption mechanism, the effective refractive indices of the system are extracted following the standard method of inversion of Fresnel transmission and reflection coefficients. The extracted indices for the cavity geometry having P=1.140 μm, D=0.760 μm, RD=280 nm, L=870 nm (the corresponding absorption peak has been marked with the dotted line in FIG. 2D) has been plotted in FIG. 3C for an x-linearly polarized excitation. It can be observed that at the resonance wavelength $\lambda_R$=4.4 μm both the real components of permittivity ($\varepsilon'$) and permeability ($\mu'$) cross zero indicating the absence of electric and magnetic polarizability of the multi-layer structure at resonance. The simulated current distribution in FIG. 3D at resonance shows that the currents on holes and disk oppose each other canceling overall charge and current distribution. Thus the total electric and magnetic induction, which is the response of the structure to the incident electromagnetic field is zero. The effective real component of permittivity and permeability of the whole structure at the resonance frequency is zero indicating complete absence of any propagating electromagnetic states. However, imaginary components of both permittivity ($\varepsilon''$) and permeability ($\mu''$) are nonzero at resonance indicating loss due to excitation of currents on hole and disk surfaces. The loss component of the permittivity at resonance originates from the excitation of LSPR and the permeability resonance stems from the opposite currents on hole and disk that forms a magnetic dipole, which interacts with the magnetic field of the incident EM wave resulting in magnetic loss. FIG. 3E shows the loss profile of the system where it can be observed that the complete loss takes place on the edges of the hole-disk system indicating the primary location of interaction. The transmitted electric field through holes excites LSP on disks, which move towards four corners of the element perpendicular to the polarization direction due to the two-dimensional lateral coupling between disks. LSP's on disks in turn excite opposite charges on the edges of holes and the amount of this interaction depends on the radiative field strength of disks, which is proportional to the distance between disk and hole arrays. As a result, two counter-propagating dipole currents on the edges of the disks and holes is induced as seen in FIG. 3D. These opposite current densities make two magnetic dipoles on two opposite sides of the hole and disks, which are localized on the edges. According to $P=\bar{J}\cdot\bar{E}$, loss happens because of these current densities, where $\bar{J}$ is the current density; $\bar{E}$ is the electric field, and P is the loss power density. The simulated 3D current distribution is shown in FIG. 3D, which clearly shows the origin of the loss on the edges of the hole/disk as observed in FIG. 3E.

Figure 4:
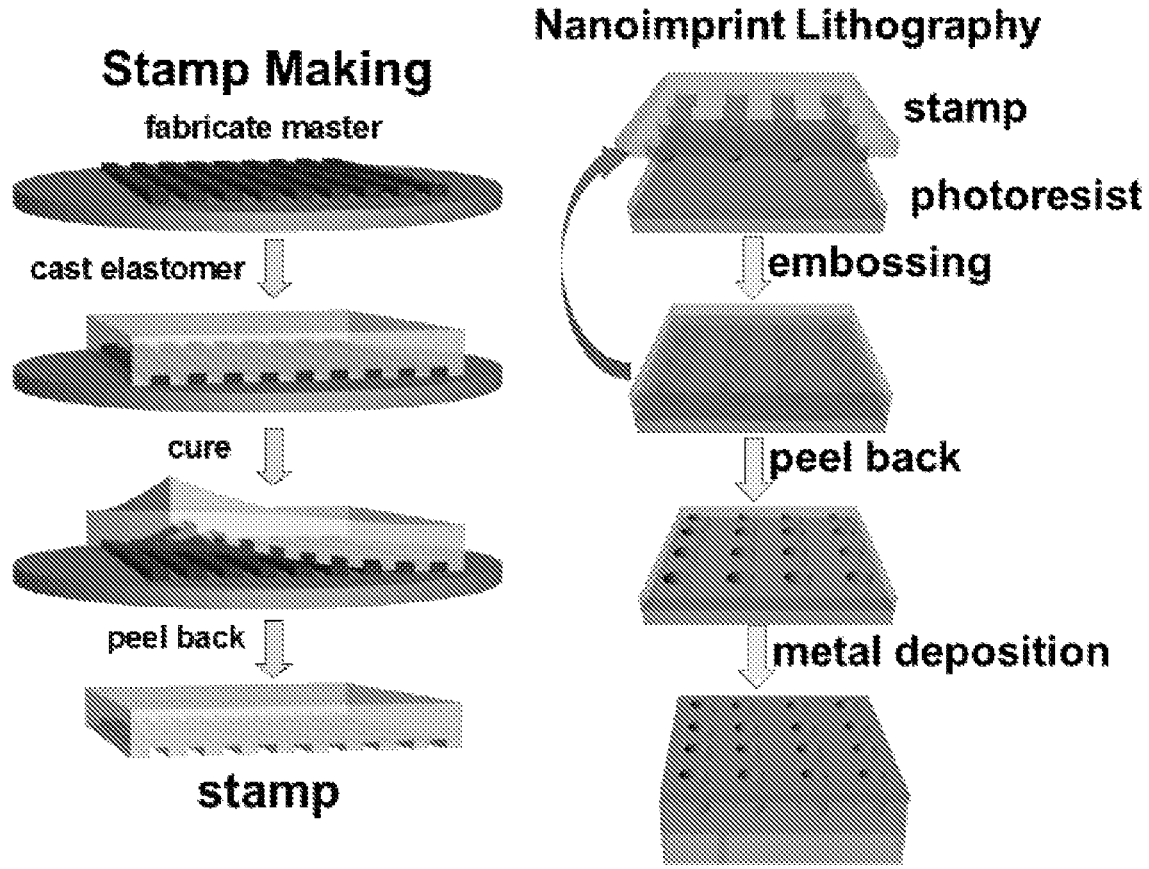
FIG. 4 schematically illustrates manufacturing steps of the optical frequency-selective absorber according to an exemplary illustrative embodiment of the invention.

The embodied frequency-selective absorber is fabricated following a simple large area nanoimprinting technique as illustrated in FIG. 4. A polydimethylsiloxane (PDMS) stamp is embossed against a photoresist (SU-8) layer spun-coated on a glass substrate coated with optically thick (200 nm) gold (mirror layer). The blanket deposition of thin layer (45 nm) of gold following an electron beam deposition step on top of the imprinted pattern completes the simple fabrication process where the deposited gold form the perforated hole pattern on the raised region of the polymer imprint and disk array in the recessed region.

Figure 5A:
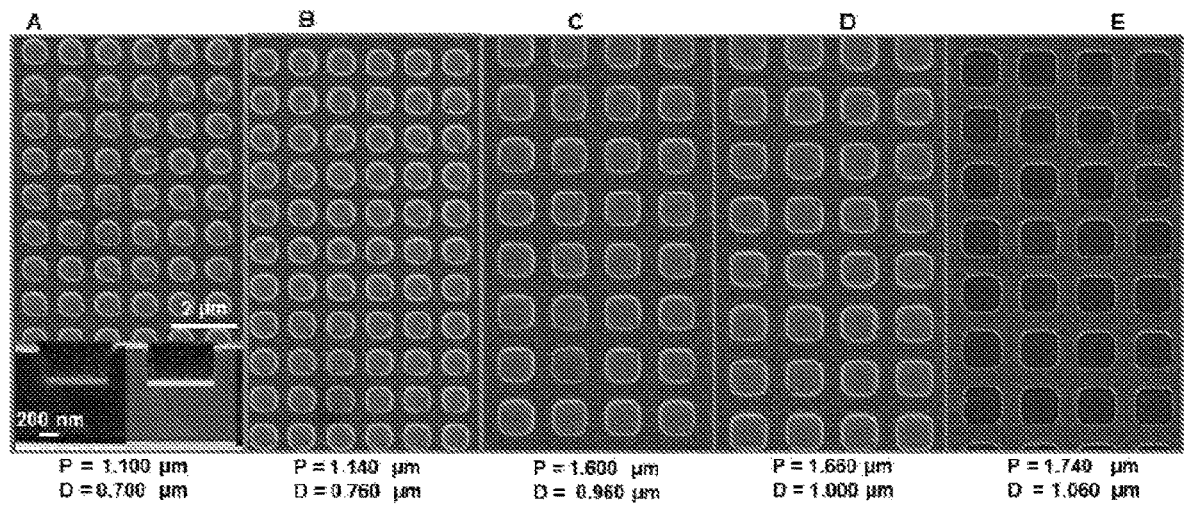
Figure 5B:
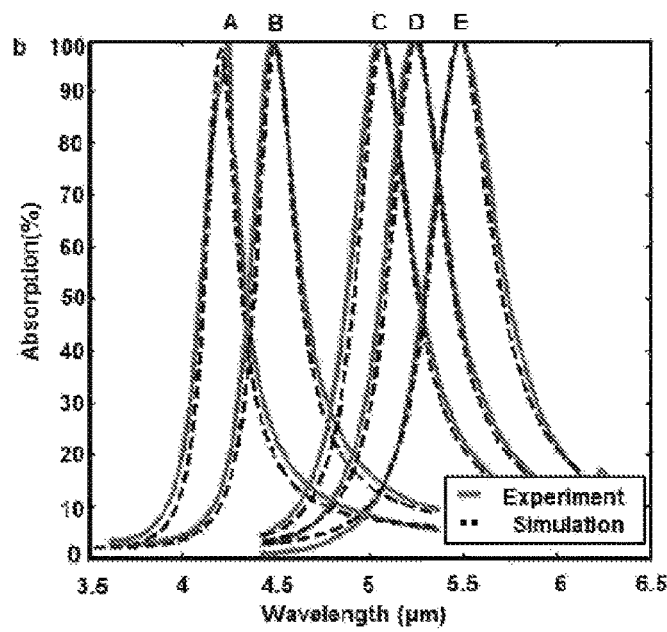
FIG. 5B shows plots of the corresponding measured absorption as a function of diameter.
Figure 5C:
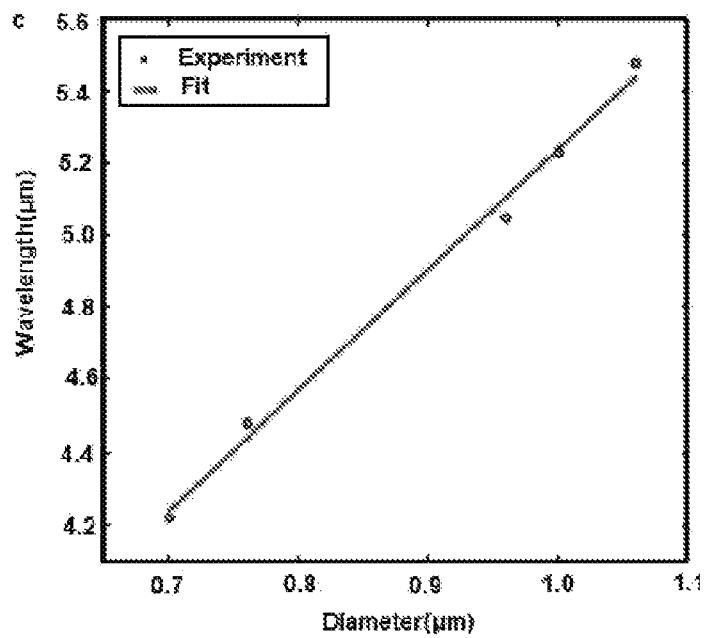
FIG. 5C shows a plot of the corresponding absorption peak locations as a function of diameter.
Figure 5D:
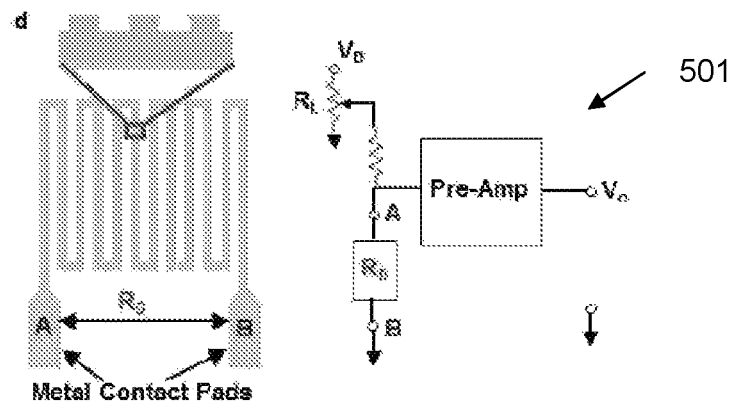
FIG. 5D schematically shows the detector layout and biasing circuit.
Figure 5E:
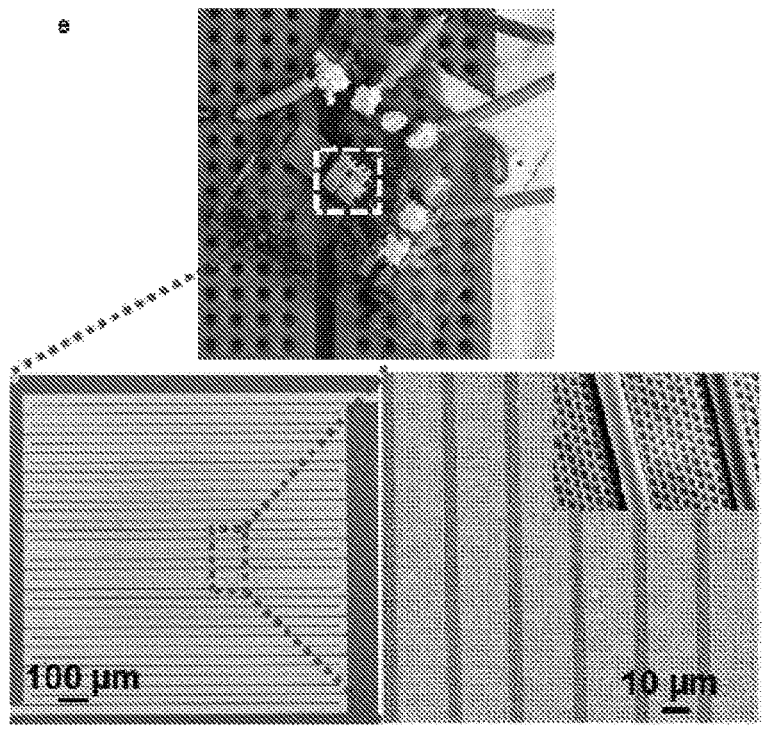
FIG. 5E shows optical and SEM images of the fabricated detector, according to exemplary aspects of the invention.
Figure 6A:
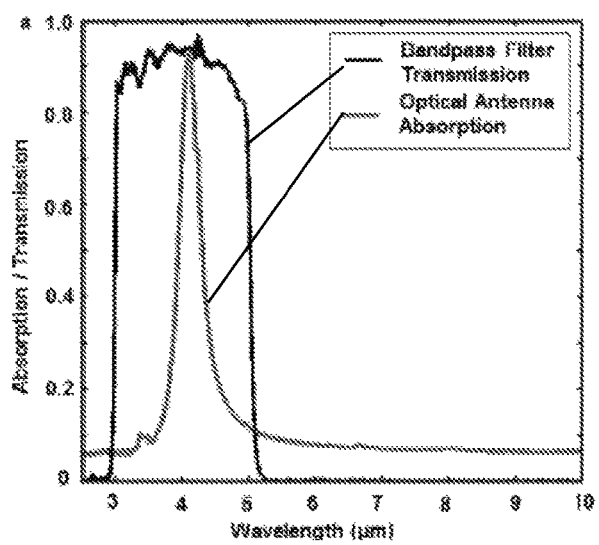
Figure 6B:
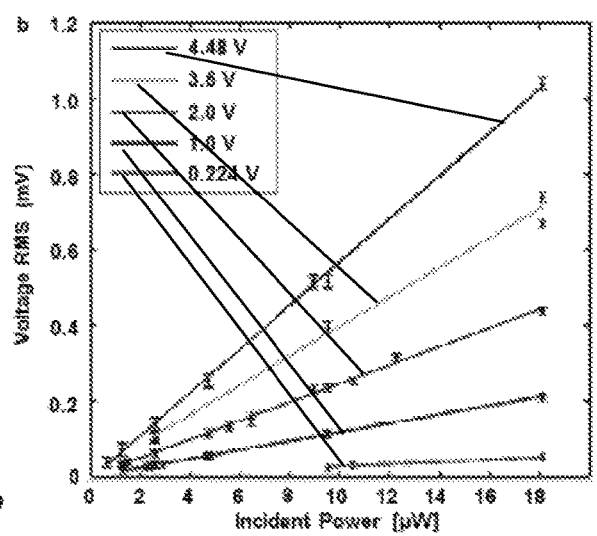
FIG. 6B shows a plot of the output voltage vs. incident power as a function of bias voltage.
Figure 6C:
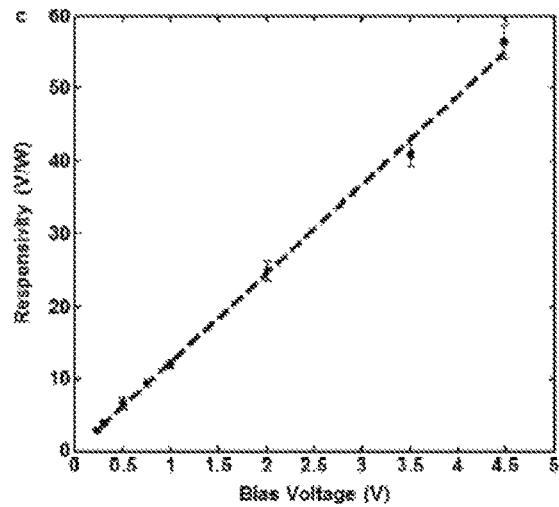
FIG. 6C is a plot showing the responsivity (output voltage and input power combined) as a function of bias voltage.
Figure 6D:
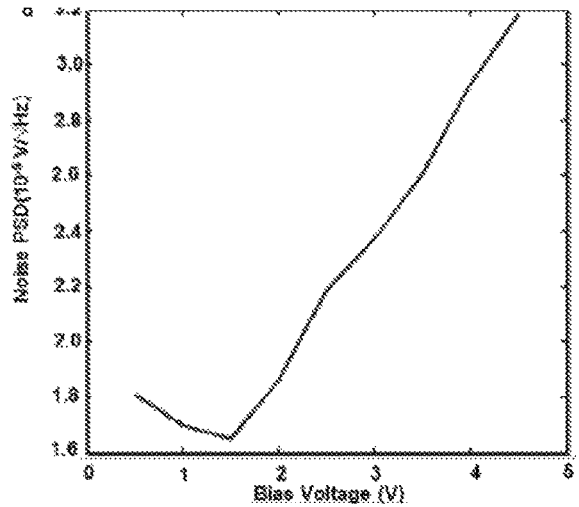
FIG. 6D is a plot showing the responsivity normalized with system noise power spectral density.
Figure 6E:
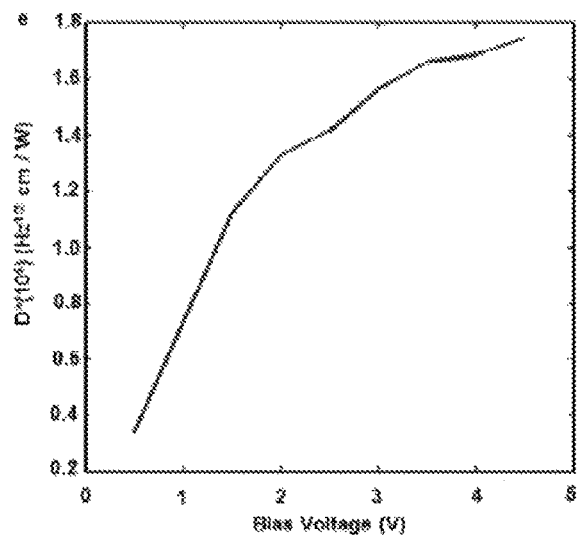
FIG. 6E is a plot showing the frequency selective D* of the system based on a 1 mm×1 mm detector area.
Figure 6F:
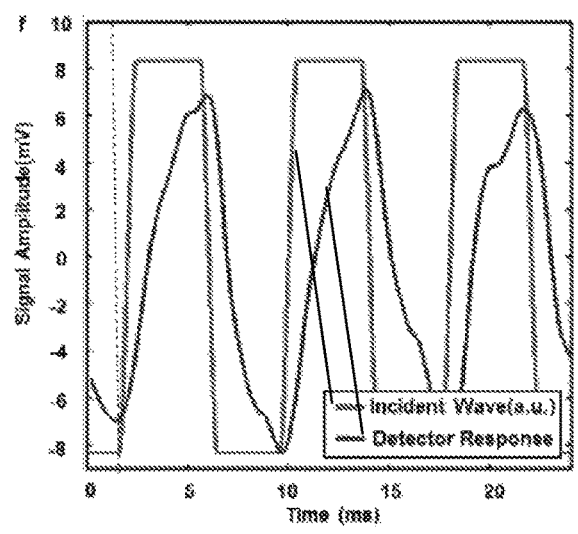
FIG. 6F is a plot showing the measured temporal response of the system with respect to a 125 Hz chopped IR radiation, according to exemplary illustrative aspects of the invention.

FIG. 5A shows scanning electron microscope (SEM) images of five (A-E) such representative systems with varied hole/disk diameters from 0.6 µm to 2.040 µm with 0.160 p.m increments for constant D/P=(0.60-0.66). The corresponding optical absorption measurements using a microscope-coupled FTIR (Bruker Inc., Hyperion 1000-Vertex 80) along with simulation predictions appear in FIG. 5B. As predicted, about 100% absorption of the incident radiation can be observed. The relation between absorption peak location and hole/disk diameter is plotted in FIG. 5C both for experimental measurement and simulation. The previously predicted linear relation between the resonance location and the hole/disk diameter is observed in experimental measurements as well. At the final stage the absorbed IR energy is converted to electrical signal so that it can be read by the electronic readout circuit. In the proposed system the enhanced absorption originates from "micro-currents" on the frequency-selective absorber surface (see FIG. 3D), which is converted to resistance change by a DC biasing circuit 501 as schematically illustrated in FIG. 5D. The low voltage biasing circuit drives a weak current through the patterned surface that results in change in output voltage as a function of absorption due to local heat generation on each hole/disk. The continuous perforated film enables electronic probing of induced "micro-current" plasma loss on each nano hole/disk via the weak bias current ($I_B$). The input impedance is increased from few ohms to k-ohm range with a serpentine super-lattice pattern in order to reduce background heating (Joule heating) due to the bias current. FIG. 5E shows the macro-scale optical image and SEM of the fabricated detector. The corresponding measured voltage output as a function of incident power for a range of bias voltage for a spectroscopic absorption around 4.4 µm (FIG. 6A) at ambient temperature and pressure is shown in FIG. 6B. The incident power is varied by changing black body source temperature. The output voltage and incident power are combined to produce responsivity, R (V/W), of the detector in FIG. 6C. A relatively high responsivity of 55 V/W is achieved at a relatively low bias voltage of 4.5 V. An expected linear relation between the responsivity and bias voltage is observed indicating a higher responsivity for higher bias voltage. However, a higher bias voltage drives a higher bias current through the ~6.2 kΩ detector increasing the Johnson noise as a collateral damage as observed in FIG. 6D where the measured noise power spectral density ($S_n$) initially goes down and then after a certain bias voltage starts increasing, the effect of which can be observed in $D^*=\sqrt{A_d}R/S_n$ ($A_d$ is detector area) measurement in FIG. 6E, which determines the detection limit by combining responsivity and system noise floor. The D* saturates as noise starts increasing as a function of bias voltage. A frequency selective D* of $2\times10^5$ $\sqrt{Hz}$ cm/W corresponding to a responsivity of 55 V/W is measured in an un-optimized geometry at ambient temperature and pressure. The measured frequency selective D* for the present case is not directly comparable to microbolometer type uncooled IR detectors due to their broadband energy absorption. The short surface plasmon life time and low thermal mass makes the proposed detector relatively faster compared to bulk absorption based thermal detectors like microbolometers. A response time (0-90%) of 2.65 ms was measured based on $f_{cp}$=125 Hz chopped IR radiation as shown in FIG. 6F, which outperforms present microbolometers' response times of 20-30 ms. Further design optimization with reduction in thermal conductivity based on a suspended detector architecture, partial vacuum seal and electrical noise reduction following well-known industrial IR detector fabrication procedures will drastically improve the D* value.

The proposed two-element frequency-selective surface demonstrates a different frequency-selective absorption mechanism. The strong dipolar coupling between the two elements enhances the absorption to ~100% when coupled with an optical cavity. The coupling between two elements can be varied flexibly to shift the resonance location and strength. Tunability can also be exploited from the cavity phase relation, which can be simply tuned with cavity thickness. Such controlled infrared absorption when implemented in conjunction with simple large area imprinting techniques leads to development of newer classes of frequency selective, low cost, uncooled infrared detectors.

We claim:

1. A method for detecting incident mid-infrared (MIR) radiation with a MIR detector comprising a mirror layer, an array of disk elements over the mirror layer, an outer layer over the array of disk elements and defining a perforated pattern, each disk element having a diameter less than a wavelength of the incident MIR radiation, the perforated pattern comprising an array of holes aligned over the array of disk elements, each hole having a diameter less than the wavelength of the incident MIR radiation, and a ground plane coupled to the outer layer, the MIR detector being in an uncooled state, the method comprising:

causing the array of disk elements and the array of holes to function as a radiation funnel to trap about 100% of the incident MIR radiation as dipole currents, the mirror layer and the outer layer defining an optical cavity therebetween for constructive interference inside the optical cavity, the radiation funnel coupling the incident MIR radiation into the optical cavity over a resonant bandwidth and for absorption based upon simultaneous zero crossing of real components of permittivity and permeability, indicating an absence of electric and magnetic polarizability of the MIR detector at resonance;

the constructive interference generating an electric field for electric dipoles on the array of disk elements and the array of holes, resulting in zero reflection in the optical cavity;

the absorption being based upon a cavity phase relation and a coupled-dipole approximation indicating that excitation of localized surface plasmon resonance overlaps with a Fabry-Perot mode inside the optical cavity;

the Fabry-Perot mode inside the optical cavity maximizing an electric field on the array of disk elements when an incident and reflecting field are in-phase on a disk surface, the constructive interference between two counter-propagating waves exciting the electric dipoles;

driving a bias current through the outer layer;

generating an input impedance for the bias current with a serpentine super-lattice pattern to reduce background heating due to the bias current; and directly probing absorption on each hole and each disk element via the bias current based upon a change in an output voltage as a function of absorption of the incident MIR radiation;

wherein a frequency range of detected MIR is based upon a cavity length of the MIR detector, a hole dimension of the MIR detector, and a disk dimension of the MIR detector; and wherein hole/disk diameter over hole/disk period equals 0.66 and a thickness of the optical cavity equals 870 nm.

* * * * *